Oct. 4, 1932.  E. G. BERRY ET AL  1,880,684
COFFEE MILL
Filed March 22, 1929   5 Sheets-Sheet 2
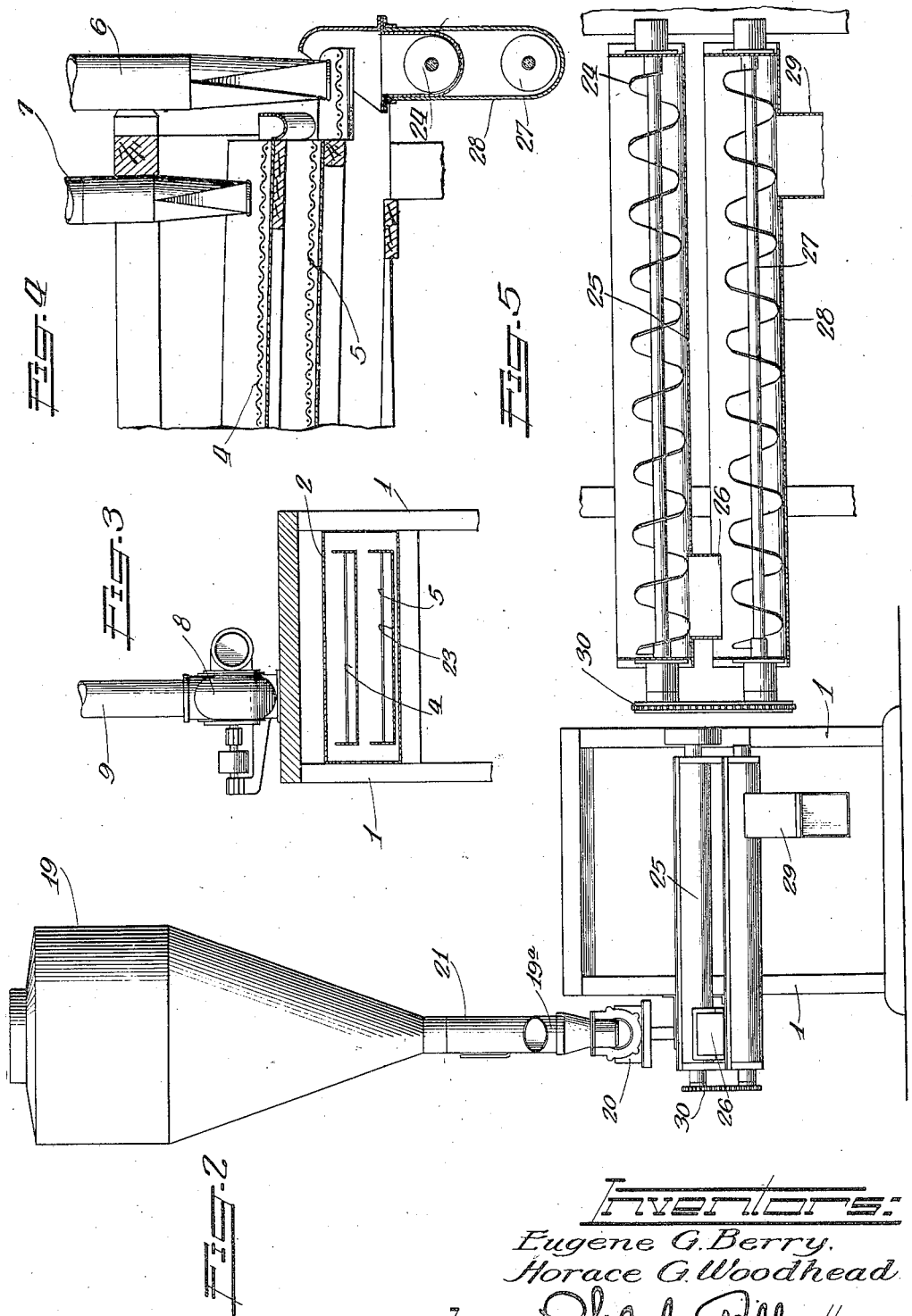
Inventors:
Eugene G. Berry,
Horace G. Woodhead
by:

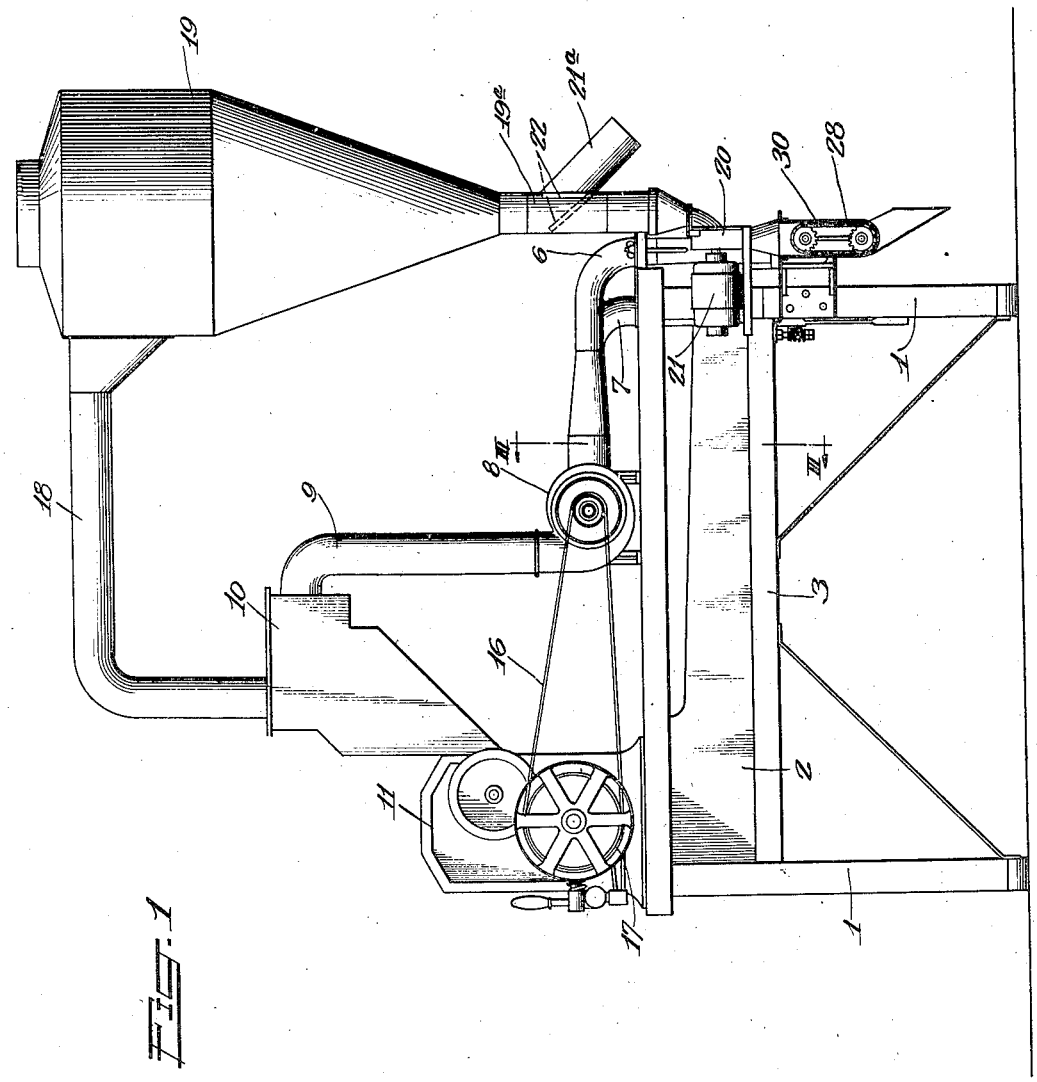

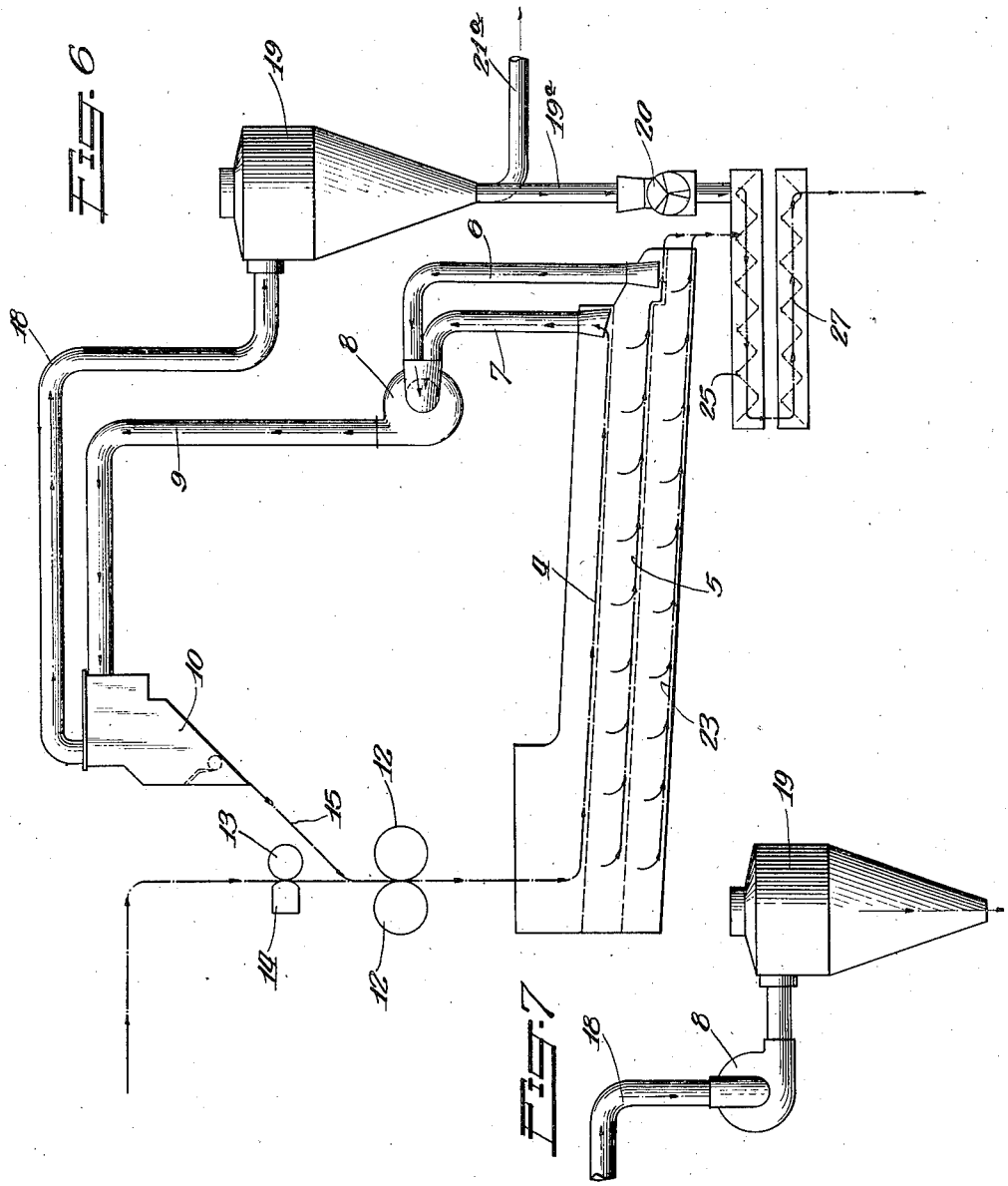

Oct. 4, 1932.  E. G. BERRY ET AL  1,880,684
COFFEE MILL
Filed March 22, 1929   5 Sheets-Sheet 4
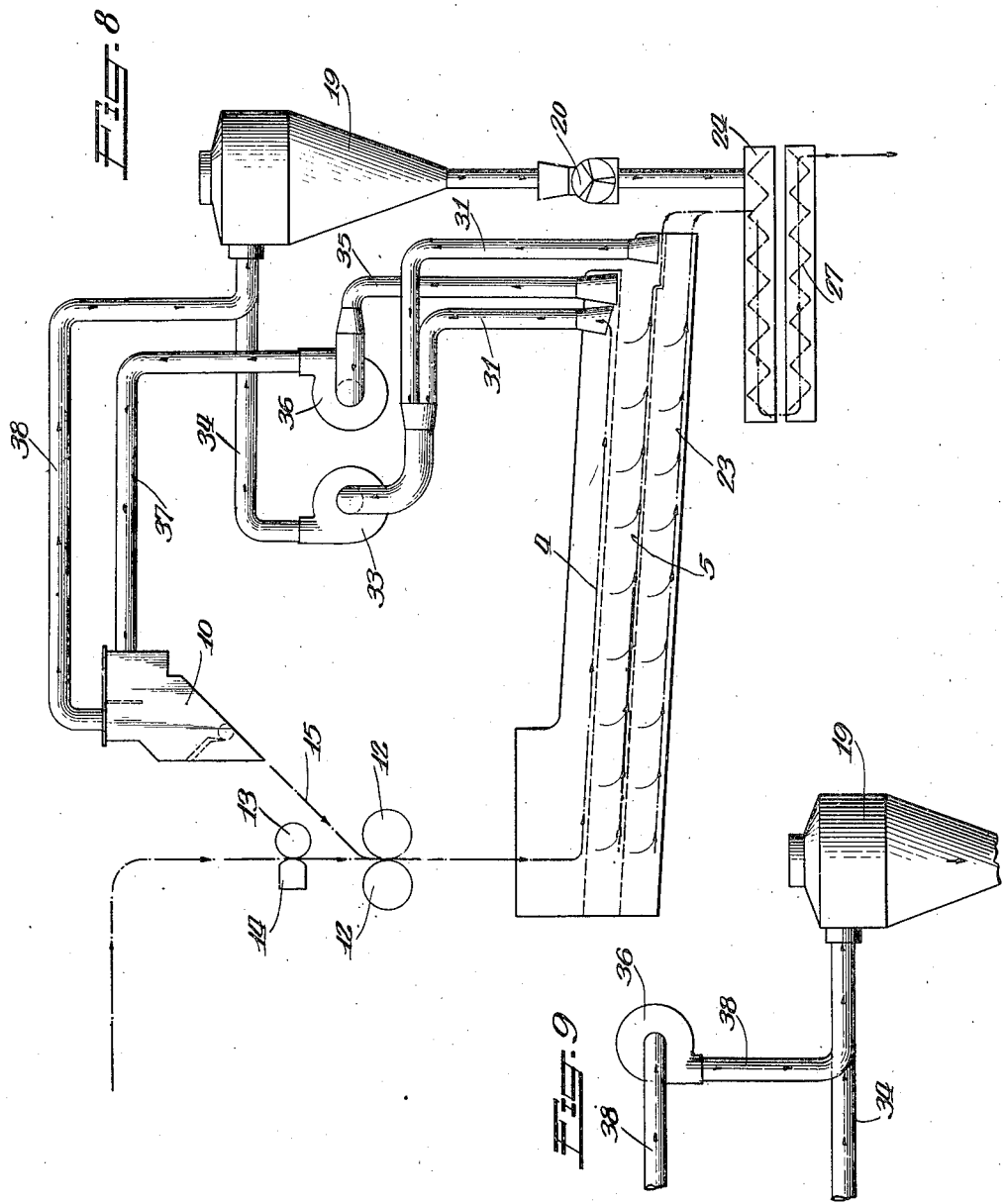

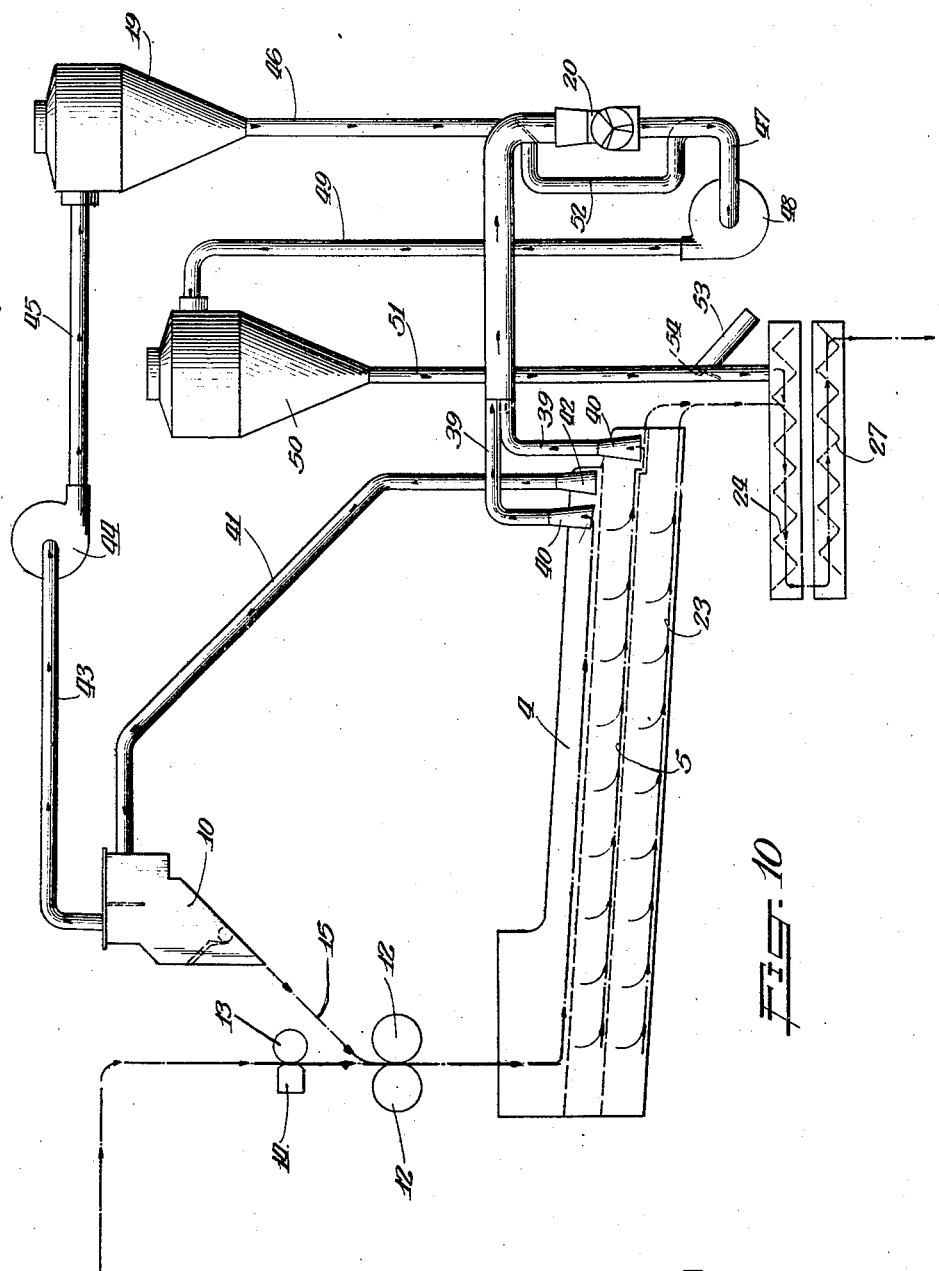

Patented Oct. 4, 1932

1,880,684

UNITED STATES PATENT OFFICE

EUGENE G. BERRY AND HORACE G. WOODHEAD, OF CHICAGO, ILLINOIS, ASSIGNORS TO B. F. GUMP CO., OF CHICAGO, ILLINOIS, A CORPORATION OF ILLINOIS

COFFEE MILL

Application filed March 22, 1929. Serial No. 349,121.

This invention relates to a coffee cutting machine, and concerns itself with certain improvements of the coffee cutting machine disclosed in the Williams Patent No. 1,682,454.

One of the objects of this invention pertains to a simplified structure which eliminates the vertical coffee elevators adjacent one end of the machine. A further object of this invention resides in the provision of means for grinding the chaff and returning it to the finished coffee and mixing the same therewith.

The invention comprises the novel structure and combinations of parts hereinafter described and more particularly pointed out and defined in the appended claims.

In the accompanying drawings which illustrate certain preferred embodiments of this invention and in which similar reference numerals refer to similar features in the different views:

Figure 1 is a side elevational view of a coffee cutting machine involving this invention.

Figure 2 is an end elevational view of such machine.

Figure 3 is a sectional view taken substantially upon the line III—III of Figure 1.

Figure 4 is an enlarged fragmentary sectional view taken through the ends of the screen and illustrating the aspirating hoods and pipes in elevation and showing the finished coffee conveyor in section.

Figure 5 is an enlarged vertical sectional view taken through the finished coffee conveyor showing the same in elevation.

Figure 6 is a diagrammatic view of a machine substantially as shown in Figure 1 to more clearly illustrate its operation.

Figure 7 is a fragmentary elevational view illustrating a slightly modified form of certain features.

Figure 8 is a diagrammatic view of a slightly modified form of improvement as applied to the machine.

Figure 9 is an elevational view of a further feature of the structure shown in Figure 8.

Figure 10 is a diagrammatic view of a further modified form of improvement that may be applied to the machine.

In connection with this invention, there is shown a coffee cutting machine comprising a plurality of supporting legs 1 which carry a boxlike structure 2 at the upper ends thereof. The boxlike structure 2 is supported upon suitable transverse members 3 that are connected between the legs. Suitable screening means are supported in the boxlike structure 2. In the present instance the screening means consists of an upper screen or sieve 4 and a lower screen or sieve 5. These sieves are similar to those disclosed in the said Williams patent in that each is provided with suitable imperforate portions directly below the aspirating hoods and pipes 6 and 7. The pipe or conduit 6 is designed for conveying the chaff from the second screen or sieve 5 while the pipe or conduit 7 is designed to remove both chaff and tailings from the end of the upper screen or sieve 4. The conduits 6 and 7 connect with a rotary blower or fan 8 which is located upon the top of the frame. A conduit 9 extends from the rotary blower 8 to a tailings and chaff separator 10. The separator 10 may be of any well known design in which the heavy particles will drop to the bottom and the chaff removed from the top by means of blowing. The chaff and tailings separator 10 discharges directly into the coffee mill proper designated by the reference numeral 11 and located upon the forward end of the machine. This coffee mill embodies a pair of coacting cutting rolls 12 as diagrammatically shown in Figure 6 and suitable breakdown mechanism consisting of a roll 13 and a breaker bar 14. It will, of course, be understood that a suitable chute may be provided within the mill housing 11 for conveying the tailings between the two rolls. In our invention the fan 8 is adapted to be driven by a belt 16 which in turn is driven by a pulley 17 secured to one of the roller shafts.

The chaff and tailings separator 10 is connected by a conduit 18 which extends from the top of the separator with a chaff collector 19. The upper portion of the chaff collector is of cylindrical form. The lower portion, however, is of conical form and merges into 10 a conduit 19a which extends into a chaff grinder which is generally denoted by the reference numeral 20, and which may be driven by a separate motor 21. The conduit 19a is preferably provided with a discharge chute or spout 21a for discharging the chaff when it is not desired to grind the same. A two-way valve 22 is located in the conduit 19a in order that the flow of the chaff may be controlled to pass either to the chaff grinder or to the spout 21a when it is desired to discharge the same and not grind the same and return it to the finished coffee.

Below the screen or sieve 5, there is a finished coffee chute 23. The finished coffee gravitates down the screen 5 and the chute 23 and falls into a conveyor 24 mounted in a suitable housing 25 which is open at the top for receiving the ground coffee. The conveyor 24 may be made according to any well known design. In the present instance it is shown in the form of a screw conveyor. The finished coffee is conveyed to the front end of the conveyor 24 where it drops down through an opening 26 in the casing 25 as shown in Figure 5. The opening 26 discharges into a second housing 28 in which there is journalled a second conveyor 27 which is also shown as of screw form. At the right hand end of the second conveyor 27 there is a discharge chute 29 through which the finished coffee passes to a bin or elevator or the like. The two shafts of the conveyors are geared together by suitable sprocket gears 30 and may be driven by any suitable power means.

The chaff grinding machine is adapted to discharge into the upper chute 25 in order that the ground chaff may be mixed with the ground and finished coffee. If the chaff grinder is located upon the right hand side of the machine as shown in Figure 2, the ground chaff will be deposited into the right hand end of the upper conveyor. However, in some instances it may be more desirable to mount the chaff collector and the chaff grinder upon the left hand side of the machine in which event the ground chaff will be discharged into the left hand end of the upper conveyor. In the diagrammatic drawings there is shown a machine in which the chaff grinder is located upon the left hand side of the machine so that the ground chaff will travel the full length of the upper conveyor and be more thoroughly mixed with the ground coffee. In the structure shown in Figures 1 and 2 in which the ground chaff is discharged into the left hand end of the upper conveyor 25 the ground chaff will meet the ground coffee as it is being conveyed to the discharge opening 26 and the ground chaff will commingle with the ground coffee and fall upon the second or lower conveyor and be conveyed to the right hand end of the lower conveyor where it will be discharged through the chute 29. As the ground coffee and ground chaff travel to the left in the lower conveyor the same will be thoroughly mixed.

Referring to the diagrammatic view shown in Figure 6, it will be noted that the chaff collector and chaff grinder are located upon the right hand end of the machine and consequently the chaff grinder will discharge into the right hand end of the upper conveyor adjacent the end remote from the opening 26 with the result that the ground chaff will travel forwardly substantially the entire length of the conveyor. It will be appreciated that as the ground chaff travels rearwardly across the top conveyor, it will be thoroughly mixed with the ground coffee as it falls upon the top conveyor. The ground coffee and ground chaff in commingled relation will then drop through the opening 26 onto the lower conveyor and will be further mixed as they pass forwardly through the lower conveyor.

In Figure 7 there is shown a slight modification in which the rotary fan 8 is placed in the pipe 18. In accordance with this modified structure the rotary fan will tend to draw the chaff and tailings into the separator without the necessity of having the tailings pass through the rotary fan as is the case in the arrangement shown in Figure 6.

In Figure 8 a slightly different arrangement is shown from that illustrated in Figure 6. In the arrangement of Figure 8, there are two chaff conduits 31 which extend from their respective hoods over the sieves. These pipes 31 extend to a rotary lower fan 33 which is connected by a conduit 34 with the chaff collector 19 which discharges it into a chaff grinder 20 from which the ground chaff gravitates to the upper conveyor 24 just as was explained with reference to Figure 6. A shaft 35 is shown as extending from the tailings hood and this shaft is connected with a rotary fan 36. The fan 36 has a conduit 37 which leads to a chaff and tailings separator 10. As ground chaff is likely to be picked up with the tailings as conduit 38 extends from the separator 10 to the chaff collector 19. It is obvious that this arrangement seeks to separately handle the chaff and tailings through appropriate suction means. The operation of the apparatus shown in Figure 8 is substantially similar to that shown in Figure 6 already described and for this reason a further description with respect to Figure 8 appears unnecessary.

In Figure 9 there is shown a slight modification for the apparatus shown in Figure 8. Instead of placing the tailings fan 36 between the separator and the sieves as shown in Figure 8, the said rotary fan 36 may be positioned in the pipe 38 which connects the separator 10 with the chaff collector and thus avoid the passage of the tailings through the fan which may be desirable in some instances.

In Figure 10, a slightly different arrangement of the apparatus is shown. In Figure 10, the two chaff hoods 40 are connected with suitable pipes or conduits 39 which extend directly to the top of the chaff grinder 20. The tailings in the apparatus shown in Figure 10 are removed by a pipe 41 which extends from the tailings hood 42. The pipe 41 extends to the chaff and tailings separator 10 from the top of which there extends a pipe 43 which connects with a rotary fan 44. The rotary fan 44 is connected by a pipe 45 with a chaff collector 19 which has a conduit 46 leading to the chaff grinder 20. It will be apparent that the apparatus shown in Figure 10 is somewhat similar to that shown in Figure 8 in that the chaff and tailings are separately handled through independent aspirating means. While the bulk of the chaff is taken off through the two pipes 39, there is always a small amount that is carried off with the tailings and this small amount is taken from the chaff separator 10 to the collector 19 through the conduits 43 and 45.

The ground chaff that emerges from the grinder 20 escapes through a pipe 47 and is sucked by a fan 48 which elevates the ground chaff through a conduit 49 to a second chaff collector 50 which empties through a pipe 51 into the top of the conveyor 24 in a manner previously described. In some instances it may not be desirable to mix the chaff with the coffee. The apparatus in Figure 10 is designed so that the chaff may be bypassed and discharged without passing into the finished coffee. To this end the chaff may be bypassed around the grinder 20 by means of a bypass pipe 52. This unground chaff which is bypassed through the pipe 52 will be elevated by the suction fan 48 to the second chaff collector. This second chaff collector will discharge the unground chaff through a spout 53 which extends from the lower end of the pipe 51 and which is controlled by a two-way valve 54. If the valve 54 is turned so as to close the pipe 51 below the spout and open the spout for the exit of the unground chaff, it will be apparent that the chaff will be kept separate and apart from the ground coffee. It may be added that the upper end of the bypass is controlled by a suitable valve for diverting the unground chaff from the chaff grinder. This bypass, however, may be eliminated since the chaff even if ground may be discharged through the spout 53 without passing to the finished coffee.

From the foregoing it will be apparent that a number of novel improvements have been made with respect to existing coffee cutting machines and which improvements afford numerous advantages and benefits.

We are aware that many changes may be made, and numerous details of construction may be varied through a wide range without departing from the principles of this invention, and, we, therefore, do not purpose limiting the patent granted hereon, otherwise than necessitated by the prior art.

We claim as our invention:

1. In a coffee cutting machine, cutting rolls, screening means for receiving the cut coffee from said rolls, aspirating means for removing the chaff and tailings from said screening means, a separator for receiving the chaff and tailings, a chaff collector, means for conveying the chaff to said collector and means for conveying the tailings to said cutting rolls.

2. In a coffee cutting machine, a pair of cutting rolls, screening means for receiving the cut coffee from said rolls, aspirating means for removing the chaff and tailings from said screening means, a separator connected to said aspirating means for separating the chaff from said tailings and means for returning the tailings to the cutting rolls.

3. In a coffee cutting machine, a pair of cutting rolls, screening means for receiving the cut coffee from said rolls, a chaff and tailings separator, suction means for conveying chaff and tailings from said screening means to said separator, means for returning the tailings to said cutting rolls and means for conveying the chaff from said separator.

4. In a coffee cutting machine, a pair of rolls, screening means for receiving the cut coffee from said rolls, a chaff and tailings separator, aspirating means for removing the chaff and tailings from said screening means and conveying the same to said separator, chaff grinding means, and means for conveying the tailings of said separator to said cutting rolls and for conveying the chaff from said separator to said chaff grinder.

5. In a coffee cutting machine, a pair of cutting rolls, screening means below said cutting rolls, horizontal mixing conveyors below said screening means, a chaff and tailings separator, suction means for removing chaff and tailings from said screening means and conveying the same to said separator, a chaff grinder, means for conveying the tailings from said separator to said cutting rolls, means for conveying the chaff from said separator to said chaff grinder, and means for conveying the finished coffee and the ground chaff to said horizontal conveyors.

6. In a coffee cutting machine, a pair of cutting rolls, screening means below said cutting rolls, a chaff and tailings separator, aspirating means for removing the chaff and tailings from said screening means to said separator, means for conveying the tailings from said separator to said cutting rolls, a chaff collector, means for conveying the chaff from said separator to said chaff collector, a chaff grinder connected to said chaff collector, and means for spouting the chaff from said collector without passing through said chaff grinder.

7. In a coffee mill, a pair of coacting rolls, screening means below said rolls, a chaff and tailings separator, suction means for elevating the chaff and tailings to said separator, means for returning the tailings to the said coacting rolls, a chaff collector, means for conveying the chaff from said separator to said chaff collector, said chaff collector having a discharge outlet, a chaff grinder connected to said chaff collector, and means for conveying the ground chaff to the finished coffee.

In testimony whereof we have hereunto subscribed our names at Chicago, Cook County, Illinois.

EUGENE G. BERRY.
HORACE G. WOODHEAD.